United States Patent
Elazar et al.

(10) Patent No.: US 7,683,929 B2
(45) Date of Patent: Mar. 23, 2010

(54) SYSTEM AND METHOD FOR VIDEO CONTENT ANALYSIS-BASED DETECTION, SURVEILLANCE AND ALARM MANAGEMENT

(75) Inventors: Avishai Elazar, Ra'anana (IL); Ayelet Back, Tel Aviv (IL); Igal Dvir, Ra'anana (IL); Guy Koren-Blumstein, Kfar Saba (IL)

(73) Assignee: Nice Systems, Ltd., Ra'Anana (IL)

( * ) Notice: Subject to any disclaimer, the term of this patent is extended or adjusted under 35 U.S.C. 154(b) by 1619 days.

(21) Appl. No.: 10/478,577

(22) PCT Filed: Dec. 26, 2002

(86) PCT No.: PCT/IL02/01042

§ 371 (c)(1),
(2), (4) Date: Nov. 24, 2003

(87) PCT Pub. No.: WO03/067360

PCT Pub. Date: Aug. 14, 2003

(65) Prior Publication Data

US 2004/0161133 A1    Aug. 19, 2004

Related U.S. Application Data

(60) Provisional application No. 60/354,209, filed on Feb. 6, 2002.

(51) Int. Cl.
*H04N 5/225* (2006.01)
*G06K 9/00* (2006.01)

(52) U.S. Cl. .................. 348/169; 382/103

(58) Field of Classification Search ............ 348/143, 348/148, 169, 154; 382/181, 103; 715/251
See application file for complete search history.

(56) References Cited

U.S. PATENT DOCUMENTS 4,145,715 A    3/1979   Clever (Continued)

FOREIGN PATENT DOCUMENTS

DE    103 58 333 A1    7/2005

(Continued)

OTHER PUBLICATIONS

Chen, et al.; A Data-Warehouse/OLAP Framework for Scalable Telecommunication Tandem Traffic Analysis; HP Labs; qchen.mhsu.dayal@hpl.hp.com.

(Continued)

*Primary Examiner*—Gims S Philippe
(74) *Attorney, Agent, or Firm*—Ohlandt, Greeley, Ruggiero & Perle, L.L.P

(57) ABSTRACT

A surveillance system and method for the automatic detection of potential alarm situation via a recorded surveillance content analysis and for the management of the detected unattended object situation. The system and method are operative in capturing surveillance content, analyzing the captured content and providing in real time a set of alarm messages to a set of diverse devices. The system provides event based debriefing according to captured objects captured by one or more cameras covering different scenes. The invention is implemented in the context of unattended objects (such as luggage, vehicles or persons), parking or driving in restricted zones, controlling access of persons into restricted zones, preventing loss of objects such as luggage or persons and counting of persons.

39 Claims, 5 Drawing Sheets

U.S. PATENT DOCUMENTS

| | | | |
|---|---|---|---|
| 4,527,151 A | 7/1985 | Byrne | |
| 4,821,118 A | 4/1989 | Lafreniere | |
| 5,051,827 A | 9/1991 | Fairhurst | |
| 5,091,780 A | 2/1992 | Pomerleau | |
| 5,303,045 A | 4/1994 | Richards et al. | |
| 5,307,170 A | 4/1994 | Itsumi et al. | |
| 5,353,618 A | 10/1994 | Crick | |
| 5,404,170 A | 4/1995 | Keating | |
| 5,491,511 A | 2/1996 | Odle | |
| 5,519,446 A | 5/1996 | Lee | |
| 5,734,441 A | 3/1998 | Kondo et al. | |
| 5,742,349 A | 4/1998 | Choi et al. | |
| 5,751,346 A | 5/1998 | Mitchell et al. | |
| 5,790,096 A | 8/1998 | Hill, Jr. | |
| 5,796,439 A | 8/1998 | Hewett et al. | |
| 5,847,755 A | 12/1998 | Wixson et al. | |
| 5,895,453 A | 4/1999 | Cook et al. | |
| 5,920,338 A | 7/1999 | Katz | |
| 6,014,647 A | 1/2000 | Nizzar et al. | |
| 6,028,626 A | 2/2000 | Aviv et al. | |
| 6,031,573 A | 2/2000 | MacCormack et al. | |
| 6,037,991 A | 3/2000 | Thro et al. | |
| 6,070,142 A | 5/2000 | McDonough et al. | |
| 6,081,606 A | 6/2000 | Hansen et al. | |
| 6,092,197 A | 7/2000 | Coueignoux | |
| 6,094,227 A | 7/2000 | Guimier | |
| 6,097,429 A | 8/2000 | Seely et al. | |
| 6,111,610 A | 8/2000 | Faroudja | |
| 6,134,530 A | 10/2000 | Bunting et al. | |
| 6,138,139 A | 10/2000 | Beck et al. | |
| 6,144,375 A * | 11/2000 | Jain et al. | 715/251 |
| 6,167,395 A | 12/2000 | Beck et al. | |
| 6,170,011 B1 | 1/2001 | Beck et al. | |
| 6,212,178 B1 | 4/2001 | Beck | |
| 6,230,197 B1 | 5/2001 | Beck et al. | |
| 6,295,367 B1 * | 9/2001 | Crabtree et al. | 382/103 |
| 6,327,343 B1 | 12/2001 | Epstein et al. | |
| 6,330,025 B1 | 12/2001 | Arazi et al. | |
| 6,345,305 B1 | 2/2002 | Beck et al. | |
| 6,404,857 B1 | 6/2002 | Blair et al. | |
| 6,427,137 B2 | 7/2002 | Petrushin | |
| 6,441,734 B1 | 8/2002 | Gutta et al. | |
| 6,549,613 B1 | 4/2003 | Dikmen | |
| 6,559,769 B2 | 5/2003 | Anthony et al. | |
| 6,570,608 B1 | 5/2003 | Tserng | |
| 6,604,108 B1 | 8/2003 | Nitahara | |
| 6,628,835 B1 | 9/2003 | Brill et al. | |
| 6,678,413 B1 * | 1/2004 | Liang et al. | 382/181 |
| 6,704,409 B1 | 3/2004 | Dilip et al. | |
| 6,970,183 B1 * | 11/2005 | Monroe | 348/143 |
| 7,076,427 B2 | 7/2006 | Scarano et al. | |
| 7,103,806 B1 | 9/2006 | Horvitz | |
| 2001/0043697 A1 | 11/2001 | Cox et al. | |
| 2001/0052081 A1 | 12/2001 | McKibben et al. | |
| 2002/0005898 A1 | 1/2002 | Kawda et al. | |
| 2002/0010705 A1 | 1/2002 | Park et al. | |
| 2002/0059283 A1 | 5/2002 | Shapiro et al. | |
| 2002/0087385 A1 | 7/2002 | Vincent | |
| 2003/0033145 A1 | 2/2003 | Petrushin | |
| 2003/0059016 A1 | 3/2003 | Lieberman et al. | |
| 2003/0128099 A1 | 7/2003 | Cockerham | |
| 2003/0163360 A1 | 8/2003 | Galvin | |
| 2004/0098295 A1 | 5/2004 | Sarlay et al. | |
| 2004/0141508 A1 | 7/2004 | Schoeneberger et al. | |
| 2004/0161133 A1 | 8/2004 | Elazar et al. | |
| 2004/0249650 A1 | 12/2004 | Freedman et al. | |
| 2005/0146605 A1 * | 7/2005 | Lipton et al. | 348/143 |
| 2006/0093135 A1 | 5/2006 | Fiatal et al. | |

FOREIGN PATENT DOCUMENTS

| | | |
|---|---|---|
| EP | 1 484 892 A2 | 12/2004 |
| GB | 9916430.3 | 7/1999 |
| WO | WO 95 29470 A | 11/1995 |
| WO | WO 98 01838 A | 1/1998 |
| WO | WO 00/73996 | 12/2000 |
| WO | WO 02/37856 A1 | 5/2002 |
| WO | WO 03 013113 A2 | 2/2003 |
| WO | WO 03/067360 A2 | 8/2003 |
| WO | WO 03/067884 A1 | 8/2003 |
| WO | WO 03 067884 A1 | 8/2003 |
| WO | WO 2004/091250 A1 | 10/2004 |

OTHER PUBLICATIONS

SERTAINTY™ Automated Quality Monitoring; © 2003 SER Solutions, Inc. www.ser.com.

SERTAINTY™ Agent Performance Optimization; © 2005 SER Solutions, Inc. www.ser.com.

Lawrence P. Mark; Sertainty™ Automated Quality Assurance; © 2003-2005 SER Solutions, Inc.

Reynolds, et al.; Robust Text-Independent Speaker Identification Using Gaussian Mixture Speaker Models; *IEEE Transactions on Speech and Audio Processing*, vol. 3, No. 1, pp. 72-83; Jan. 1995.

Chaudhari, et al.; Very Large Population Text-Independent Speaker Identification using Transformation Enhanced Multi-Grained Models; IBM T.J. Watson Research Center. Oct. 2000.

Reynolds, et al.; Speaker Verification Using Adapted Gaussian Mixture Models; M.I.T. Lincoln Laboratory; Digital Signal Processing 10, pp. 19-41 (Oct. 1, 2000).

Zigel, et al.; How to Deal with Multiple-Targets in Speaker Identification Systems?; NICE Systems Ltd., Audio Analysis Group.

Bimbot, et al.; A Tutorial on Text-Independent Speaker Vertification; *EURASIP Journal on Applied Signal Processing*; pp. 430-451; © 2004 Hindawi Publishing Corporation.

Muthusamy, et al.; Reviewing Automatic Language Identification; *IEEE Signal Processing Magazine*; pp. 33-41; Oct. 1994.

Zissman; Comparison of Four Approaches to Automatic Language Identification of Telephone Speech; *IEEE Transactions on Speech and Audio Processing*, vol. 4, No. 1, pp. 31-44; Jan. 1996.

Amir, et al.; Towards an Automatic Classification of Emotions in Speech; Communications Engineering Department, Center for Technological Education Holon.

NiceVision—Secure your Vision, a prospect by NICE Systems, Ltd., Copyright 2002.

NICE Systems announces New Aviation Security Initiative, reprinted from Security Technology & Design, Dec. 2001.

(Hebrew) "the Camera That Never Sleeps" from Yediot Aharonot.

Freedman, I. Closing the Contact Center Quality Loop with Customer Experience Management, Customer Interaction Solutions, vol. 19, No. 9, Mar. 2001.

PR Newswire, NICE Redefines Customer Interactions with Launch of Customer Experience Management, Jun. 13, 2000.

PR Newswire, Recognition Systems and Hyperion to Provide Closed Loop CRM Analytic Applications, Nov. 17, 1999.

Financial companies want to turn regulatory burden into competitive advantage, Feb. 24, 2003, printed from InformationWeek, http://www.informationweek.com/story/IWK20030223S0002.

SEDOR—Internet pages form http://www.dallmeier-electronic.com.

(Hebrew) print from Haaretz, "The Computer at the Other End of the Line", Feb. 17, 2002.

PCT International Search Report.

* cited by examiner

SYSTEM AND METHOD FOR VIDEO CONTENT ANALYSIS-BASED DETECTION, SURVEILLANCE AND ALARM MANAGEMENT

RELATED APPLICATIONS

The present invention relates and claims priority from U.S. provisional patent application Ser. No. 60/354,209 titled ALARM SYSTEM BASED ON VIDEO ANALYSIS, filed 6 Feb. 2002.

BACKGROUND OF THE INVENTION

1. Field of the Invention

The present invention relates to video surveillance systems in general, and more particularly to a video content analysis-based detection, surveillance and alarm management system.

2. Discussion of the Related Art

Due to the increasing number of terror attacks and potential terror-related threats, one of the most critical surveillance challenges today is the timely and accurate detection of suspicious objects, such as unattended luggage, illegally parked vehicles, suspicious persons, and the like, in or near airports, train stations, federal and state government buildings, hotels, schools, crowded public places typically situated at city centers, and other sensitive areas. In accordance with the prevailing known tactics of terrorist organizations, unattended innocent-looking objects, such as a suitcase, could contain hidden explosive materials installed therein to effect a controlled explosion and thereby inflict massive impact damage to the near environment and the individuals within. Likewise recent attacks have been perpetrated through the use of vehicle bombs, seemingly innocent until explosion. Since these hidden explosives are usually activated by the setting of carefully timed (typically short-period) detonator means, or by an operator who is at the scene or close by, the prompt, rapid and timely detection of suspicious objects, such as unattended luggage, vehicles parking in forbidden zones, suspicious persons, persons leaving unattended suitcases or vehicles, and the like, could prevent life-threatening situations. Similarly, it is important in areas, such as airports, to be able to track persons and objects, such as suitcases and cars, to assist in locating lost luggage, and to restrict access of persons or cars to certain zones. The applications of such abilities are not only for security purposes.

Recently, the authorities responsible for the safety of the public have been attempting to cope with the problems listed above in the most obvious manner by increasing the number of human personnel tasked for the detection, identification and consequent handling of suspicious objects, including vehicles, luggage and persons. At the same time, in order to maintain substantially unobstructed passenger flow and in order to minimize transport delays and consequent public frustration, the security personnel have been obliged to utilize inefficient and time-consuming procedures. One drawback of the above human-centric solution concerns the substantially increased expenses associated with the hiring of a large number of additional personnel. Another drawback concerns the inherent inefficiency of the human-centric procedures involved. For example, specific airport security personnel must perform visual scanning, tracking, and optional handling of objects in sensitive transit areas 24 hours a day, where the sheer number of luggage passing through these areas effect increased fatigue accompanied naturally with diminished concentration. In the same manner, in a traffic-extensive area wherein specific security personnel must watch, track and optionally handle vehicles parking in restricted areas, natural weariness soon sets in and the efficiency of the human-centric procedure gradually deteriorates.

Currently available surveillance systems are designed for assisting human security officers. These systems typically include various image acquisition devices, such as video cameras, for capturing and recording imagery content, and various detector devices, such as movement detectors. The existing surveillance systems have several important disadvantages. The type of alarms provided by the detectors is substantially limited. The video images recorded by the cameras are required to be monitored constantly by human security personnel in order to detect suspicious objects, people and behavior. An alarm situation has to be identified and suitably handled by the personnel where a typical handling activity is the manual generation and distribution of a suitable alarm signal. Since these surveillance systems are based on human intervention the problems related to natural human-specific processes, such as fatigue, lack of concentration, and the like, are still remain in effect.

A further drawback of existing surveillance systems concern the failure of those systems to handle certain inherently suspicious events that were captured by the cameras monitoring a scene. For example, current surveillance systems associated with airport security application, typically fail to identify a situation as suspicious where the situation involves a vehicle arriving at a monitored airport terminal, an occupant of the vehicle leaving of the vehicle, and the departure of the occupant from the monitored scene in a direction that is opposite to the terminal.

Yet another drawback of the current systems concern the inability of the current systems to identify a set of events linked to the same object in the same area throughout a pre-defined surveillance period. For example, when "suitcase" object is left in the scene by a first person and later it is picked up by a second person then the leaving of the suitcase and the picking up of the suitcase constitute a set of linked events.

Still another drawback of the current systems concern the inherent passivity of systems due to the fact that the operations of the systems are based on events initiated by the operators and due to the fact that the systems provide no built-in alerts.

In addition, existing systems are incapable of associating a retrieved event or object through the use of important parameters, such as color of hair, color of clothing and shoes, complexion (via the use of a color histogram), facial features (via face recognition routines), normalized size of the object (distance from the camera), and the like.

It would be easily perceived by one with ordinary skills in the art that there is a need for an advanced and enhanced surveillance, object tracking and identification system. Such a system would preferably automate the procedure concerning the identification of an unattended object substantially and would utilize cost-effective, efficient methods.

SUMMARY OF THE PRESENT INVENTION

One aspect of the present invention relates to a method for analyzing video data, comprising receiving a video frame, comparing said video frame to background reference frame to locate difference, locating a plurality of objects to form a plurality of marked objects; and determining a behavior pattern for an object according to the difference, said behavior pattern is defined according at least one scene characteristic. The method further comprises producing an updated background reference frame. The method further comprising determining the difference performed by creating a difference frame between the video frame and the background reference frame. The method further comprises finding a new object when determining the difference and an alarm according to said behavior pattern. A pre-defined pattern of suspicious behavior comprises an object presenting unpredictable behavior.

A second aspect of the present invention relates to a system for analyzing video data comprising a plurality of video frames, the system comprising, a video frame preprocessing layer for determining a difference between a plurality of video frames, an object clustering layer for detecting a plurality of objects according to said difference, and an application layer for characterizing said plurality of objects according to scene characteristic. The difference is determined between a video frame and a reference frame. The system further comprises a background refreshing layer for preparing an updated reference frame according to the said difference. The scene characteristic defines a behavior pattern for an object, such that if the object exhibits the behavior pattern, the scene characteristic is detected. If the scene characteristic is detected, an alarm is generated. The scene characteristic further comprises a parameter for determining if the object exhibits the behavior pattern.

A third aspect of the present invention refers to a system for detecting a vehicle remaining in a restricted zone for at least a minimum period of time, comprising, a video content analysis module for analyzing video data of the restricted zone, said video content analysis module further comprising an object tracking component, and an application layer for receiving data from said video content analysis module and for detecting a vehicle remaining in the restricted zone for the minimum period of time, and said application layer generating an alarm upon detection.

A fourth aspect of the present invention refers to a system for detecting unattended luggage, bag or any unattended object in an area, comprising, a video content analysis module for analyzing video data of the area, said video content analysis module further comprising an object tracking component, and an application layer for receiving data from the video content analysis module and for detecting an unattended object, wherein said unattended object has not been attended in the area for more then a predefined period of time.

A fifth aspect of the present invention refers to a surveillance system for the detection of an alarm situation, the system comprising the elements of, a video analysis unit for analyzing video data representing images of a monitored area, the video analysis unit comprising an object tracking module to track the movements and the location of a video object, a detection, surveillance and alarm application for receiving video data analysis results from the video analysis unit, for identifying an alarm situation and to generate an alarm signal, an events database to hold video objects, video object parameters and events identified by the application. The system comprises the elements of, an application driver to control the detection, surveillance and alarm application, a database handler to access, to update and to read the events database, a user interface component to communicate with a user of the system, an application setup and control component to define the control parameters of the application, an application setup parameters table to store the control parameters of the application. The system further comprises the elements of, a video data recording and compression unit to record and compress video data representing images of a monitored area, a video archive file to hold the recorded and compressed video data representing images of the a monitored area, an alarm distribution unit to distribute the alarm signal representing an alarm situation. The system further comprises the elements of, a video camera to obtain the images of a monitored area, a video capture component to capture video data representative of the images of the monitored area, a video transfer component to transfer the captured video data to the video analysis unit and the recording compressing and archiving unit, a computing and storage device. The object tracking module comprises the elements of, a video frame preprocessing layer for determining the difference between video frames, an objects clustering layer for detecting objects in accordance with the determined difference, a scene characterization layer for characterizing the object according to characteristic of a scene, a background refreshing layer for preparing an updated reference according to the determined difference. The detection surveillance and alarm application is operative in the detection of an unattended object in the monitored area. Any video camera within the system, the video capturing component, the video transfer component and the computing and storage device can be separated and can be located in different locations. The interface between the video camera, the video capturing component, the video transfer component and the computing and storage device is a local or wide area network or a packed-based or cellular or radio frequency or micro wave or satellite network. The unattended object is a luggage left in an airport terminal for a pre-determined period or a vehicle parking in a restricted zone for a pre-defined period. The detection surveillance and alarm application is operative in the detection of an unpredicted object movement. The analysis is also performed on audio data or thermal imaging data or radio frequency data associated with the video data or the video object in synchronization with the video data. The video capture component captures audio or thermal information or radio frequency information in synchronization with the video data.

A sixth aspect of the present invention refers to a surveillance method for the detection of an alarm situation, the surveillance to be performed on a monitored scene having a camera, the method comprising the steps of, obtaining video data from the camera representing images of a monitored scene, analyzing the obtained video data representing images of the object within the monitored scene, the analyzing step comprising of identifying the object within the video data, and inserting the identified object and the event into an event database. Another embodiment of the method further comprises the steps of, retrieving of the object associated with an event, according to user instruction displaying the video event associated with the retrieved object. The method further comprises the steps of, retrieving at least two events, associating according to parameters of the object, the object with the at least two events. The method comprises the steps of, debriefing the object associated with the event to identify the pattern of behavior or movement of the object within the scene within a predefined period of time. The method further comprises the steps of, pre-defining patterns of suspicious behavior; and pre-defining control parameters. The method further comprises the steps of, recognizing an alarm situation according to the pre-defined patterns of suspicious behavior, and generating an alarm signal associated with the recognized alarm situation. The method further comprises the steps of, implementing patterns of suspicious behavior introducing pre-defined control parameters, recording, compressing and archiving the obtained video data, distributing the alarm signal representing an alarm situation across a pre-defined range of user devices. The pre-defined pattern of suspicious behavior comprises, an object entering a monitored scene, the object separating into a first distinct object and a second distinct object in the monitored scene, the first distinct object remaining in the monitored scene without movement for a pre-defined period, and the second distinct object leaving the monitored scene. The pre-defined pattern of suspicious behavior comprises, an object entering the monitored scene, the object ceasing its movement, the size of the object is recognized as being above a pre-defined parameter value, and the object remaining immobile for a period recognized as being above a pre-defined parameter value. The method does further comprise identifying information associated with the object for the purpose of identifying objects.

BRIEF DESCRIPTION OF THE DRAWINGS

The present invention will be understood and appreciated more fully from the following detailed description taken in conjunction with the drawings in which.

DETAILED DESCRIPTION OF THE PREFERRED EMBODIMENT

A monitoring and surveillance system and method for the detection of potential alarm situation via a recorded surveillance content analysis and for the management of the detected unattended object situation via an alarm distribution mechanism is disclosed. The proposed system and method includes an advanced architecture and a novel technology operative in capturing surveillance content, analyzing the captured content and providing in real time a set of alarm messages to a set of diverse devices. The analysis of the captured content comprises a unique algorithm to detect, to count and to track objects embedded in the captured content. The present invention provides a detailed description of the applications of this method. The method and system of the present invention may be implemented in the context of unattended objects (such as luggage, vehicles or persons), parking or driving in restricted zones, controlling access of persons into restricted zones, preventing loss of objects such as luggage or persons and counting of persons.

In the preferred embodiments of the present invention, the monitored content is a video stream recorded by video cameras, captured and sampled by a video capture device and transferred to a video processing unit. The video processing unit performs a content analysis of the video images and indicates an alarm situation in accordance with the results of the analysis. In other preferred embodiment of the invention, diverse other content formats are also analyzed, such as thermal based sensor cameras, audio, wireless linked camera, data produced from motion detectors, and the like.

The first preferred embodiment of the present invention concerns the detection of unattended objects, such as luggage in a dynamic object-rich environment, such as an airport or city center. The second preferred embodiment of the invention concerns the detection of a vehicle parked in a forbidden zone, or the extended-period presence of a non-moving vehicle in a restricted-period parking zone. Forbidden or restricted parking zones are typically associated with sensitive traffic-intensive locations, such as a city center. Another preferred embodiment of the invention concerns the tracking of objects such as persons in various scenarios, such as a person leaving the vehicle away from the terminal, which may equal suspicious (unpredicted) behavioral pattern. In other possible embodiments of the present invention the system and method can be implemented to assist in locating lost luggage and to restrict access of persons or vehicles to certain zones. Other preferred embodiments of the invention could regard the detection of diverse other objects in diverse other environments. The following description is not meant to be limiting and the scope of the invention is defined only by the attached claims.

Figure 1:
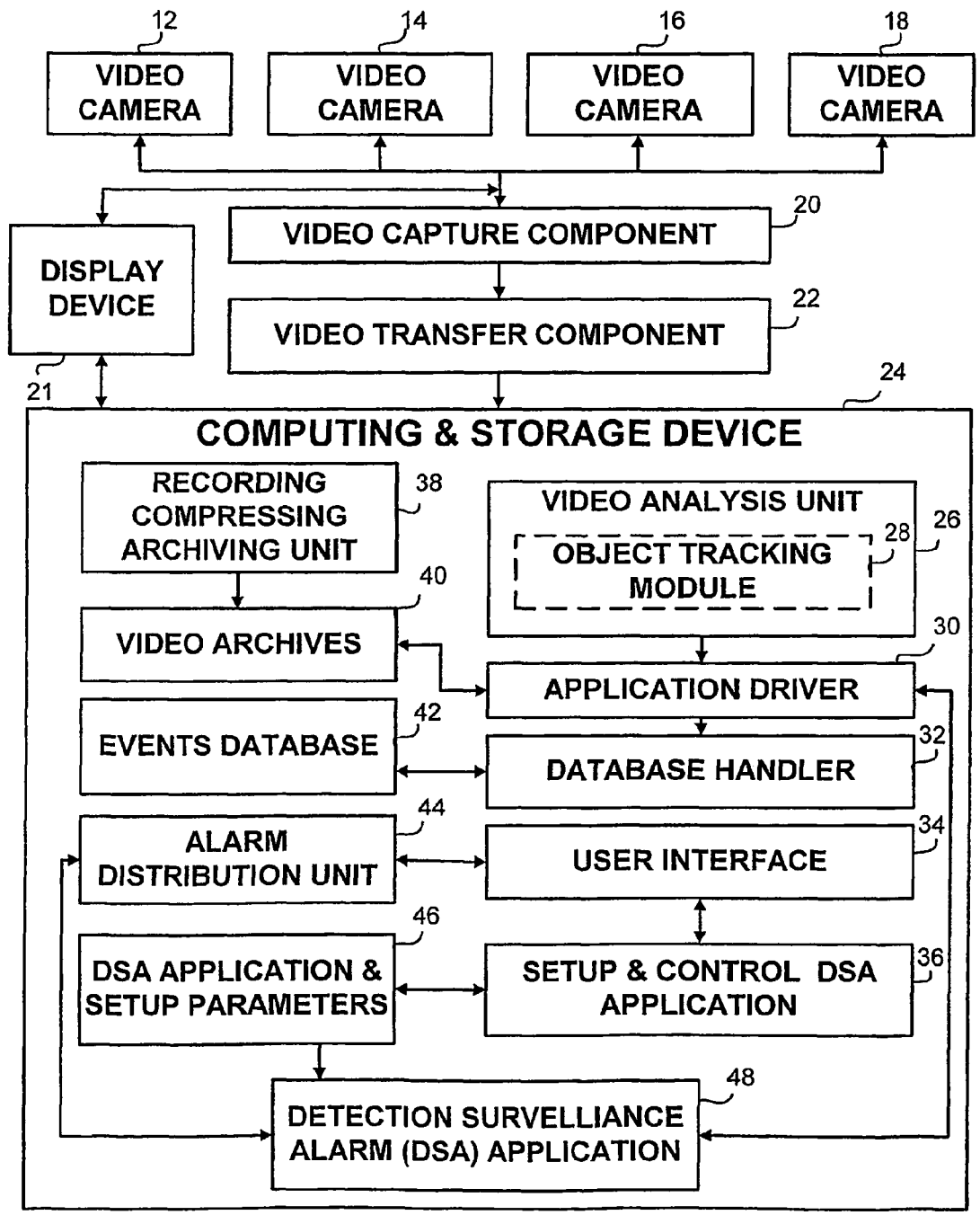
FIG. 1 is a schematic block diagram of the system architecture, in accordance with the preferred embodiments of the present invention.

Referring to FIG. 1 a set of video cameras 12, 14, 16, 18 operate in a security-wise sensitive environment and cover a specific pre-defined zone that is required to be monitored. The area monitored can be any area preferably in a transportation area including an airport, a city center, a building, and restricted or non-restricted areas within buildings or outdoors. The cameras 12, 14, 16, 18 could be analog devices or digital devices. The cameras can capture normal light, infrared, temperature, or any other form of radiation. By using audio capturing devices such as a microphone (not shown), the cameras can also capture auditory signals, such as noise generated by machines and voices made by persons. The cameras 12, 14, 16, 18 continuously acquire and transmit sequences of video images to a display device 21, such as a video terminal, operated by a human operator. The display device 21 could be optionally provided with video images from the vide archives 40 by the computing and storage device 24. The cameras, 12, 14, 16, 18 transmit sequences of video images to a video capture component 20 via suitably wired connections. The video capture component 20 could capture the images through an analog interface, a digital interface or through a Local Area Network (LAN) interface or Wide Area Network (WAN), IP, Wireless, Satellite connectivity. The video capture component 20 can be a NICEVISION system manufactured by Nice Systems Ltd., Raanana, Israel. The video capture component 20 can also be configured to capture audio signals captured by the cameras audio capturing devices. The audio and video signals are preferably synchronized at the system level. The component 20 receives the sequences of video images and appropriately samples the video stream. Where the processing of the captured video stream is performed by an external computing platform, such as a Personal Computer (PC), a UNIX workstation, or a mainframe computer, the unit 20 sends the sampled video information to a video transfer component 22. The video transfer component 22 transfers the video information to a computing and storage device 24. The device 24 could be an external computing platform, such as a personal computer (PC), a UNIX workstation or a mainframe computer having appropriate processing and storage units or a dedicated hardware such as a DSP based platform. It is contemplated that future hand held devices will be powerful enough to also implement device 24 there within. The device 24 could be also an array of integrated circuits with built-in digital signal processing (DSP) and storage capabilities attached directly to the video capture component 20. The capture component 20 and the transfer component 22 are preferably separate due to the fact that a capture component can be located at the monitored scene, while a transfer component can be located away from the monitored scene. In another preferred embodiment the capture and the transfer components can be located in the same device. The device 24 includes a video analysis unit 26, an application driver 30, a database handler 32, a user interface 34, a setup and control Detection Surveillance and Alarm (DSA) application 36, a recording compressing and archiving unit 38, a video archives 40, an events database 42, an alarm distribution unit 44, a DSA application and setup parameters file 46, and DSA application 48. Optionally, whenever video is captured and processed, audio signals captured in association with these captured video signals can be stored and tagged as relating to the video captured and processed.

Still referring to FIG. 1 the video content is transferred optionally to the recording, compressing, and archiving unit 38. The unit 38 optionally compresses the video content and stores the compressed content to the video archive files 40. The video archive files 40 could be suitable auxiliary storage devices, such as optical disks, magnetic disks, magnetic tapes, or the like. The stored content is held on the file 40 for a pre-defined (typically long) period of time in order to enable re-play, historical analysis, and the like. In parallel the video content is transferred to the video analysis unit 26. The unit 26 receives the video input, activates the object tracking module 28 and activates the application driver 30. In accordance, with results of the video analysis performed in conjunction with the object tracking module 28, the video analysis unit 26 further generates the appropriate alarm or indication signal where a specific alarm situation is detected. The application driver 30 includes the logic module of the application 48. The driver 30 receives event data and alarm data from the video analysis unit 26 and inserts the event data and the alarm data via the database handler 32 into the events database 42. The driver 30 further controls the operation of the DSA application 48. The setup and control DSA application 36 is used by the user of the system in order perform system setup, to define control parameters, and the like. The user interface 34 is responsible for the communication with the user. The event database 42 stores the event data and the alarm data generated by the video analysis unit 26. The event database 42 also holds the search parameters for searching objects or events for the purpose of investigating the events or objects. The search parameters include the object circle-like shape and object location parameters. Other object search parameters can also include data collected from various cameras, which may have captured the same object. The collected data could provide important information about the object, such as object type (animate or inanimate), object identification (via face recognition), color histogram (color of hair, of cloth, of shoes, of complexion), and the like. The parameters allow finding associations between objects and events captured by different cameras. The alarm distribution unit 44 optionally distributes the received alarm signals to a variety of alarm and messaging device. The DSA application and setup parameter file 46 stores the setup information and parameters generated by the user via the setup and control DSA application 36. The DSA application 48 provides real-time video to the user, performs re-plays of video by request, submits queries to the event database 42 and provides alarm messages, such as suitably structured pop-up windows, to the user via the user interface 34.

Still referring to FIG. 1 the units and components described could be installed in distinct devices distributed randomly across a Local Area Network (LAN) that could communicate over the LAN infrastructure or across Wide Area Networks (WAN). One example is a Radio Frequency Camera that transmits composite video remotely to a receiving station, the receiving station can be connected to other components of the system via a network or directly. The units and components described could be installed in distinct devices distributed randomly across very wide area networks such as the Internet. Various means of communication between the constituent parts of the system can be used. Such can be a data communication network, which can be connected via landlines or cellular or like communication devices and that can be implemented via TCP/IP protocols and like protocols. Other protocols and methods of communications, such as cellular, satellite, low band, and high band communications networks and devices will readily be useful in the implementation of the present invention. The components could be further co-located on the same computing platform or distributed across several platforms for load balancing. The components could be redundantly replicated across several computing, platforms for specific operational purposes, such as being used as back-up systems in the case of equipment failure, and the like. Although on the drawing under discussion only a limited set of cameras and only a single computing and storage device are shown it will be readily perceived that in a realistic environment a plurality of cameras could be connected to a plurality of computing and storage devices.

Figure 2:
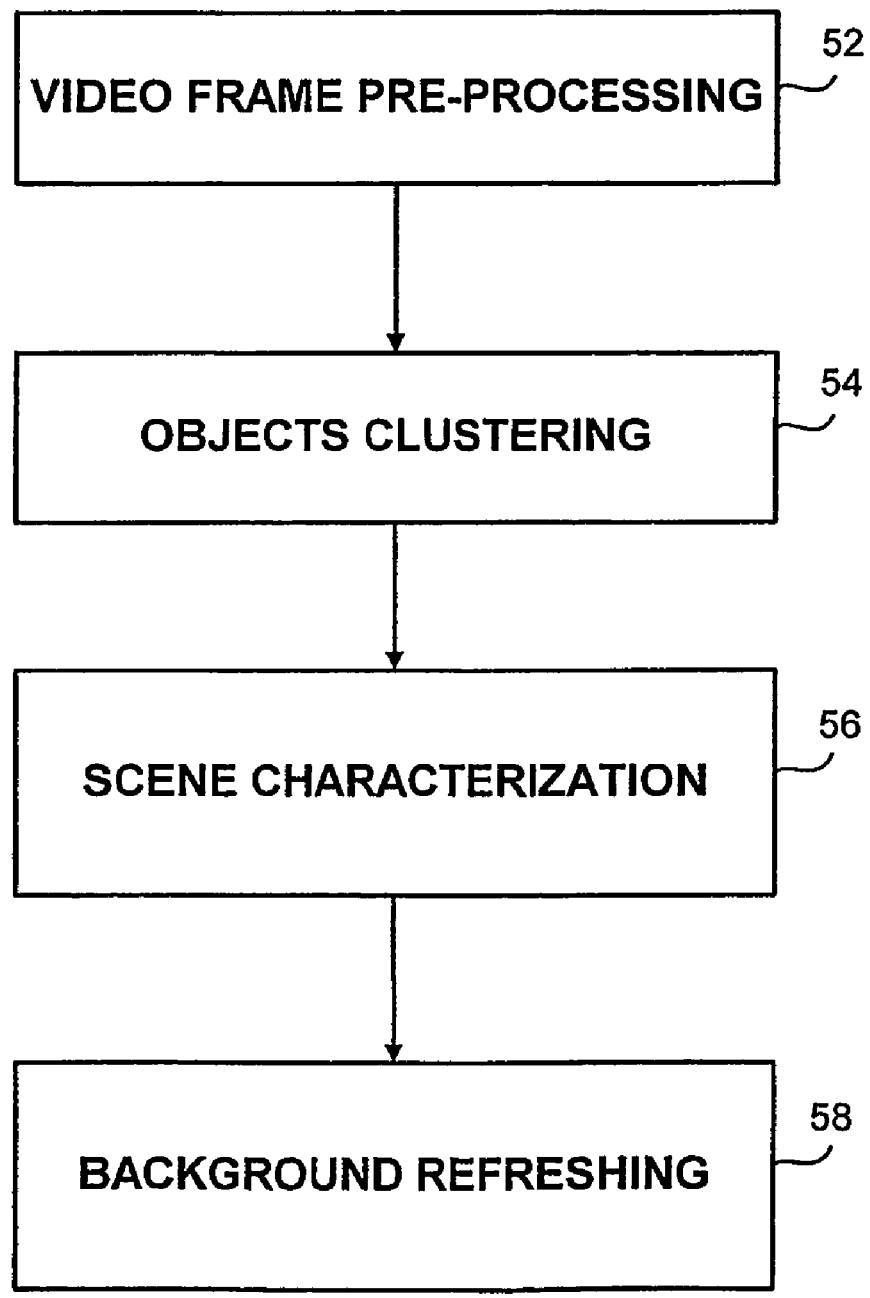
FIG. 2 is a simplified flowchart that illustrates the operation of the object tracking method, in accordance with the preferred embodiment of the present invention.

Referring now to FIG. 2 showing illustrates the operation of the object tracking method. The proposed system and method is based upon a video content analysis method that can detect, track and count objects in real time in accordance with the results of the video stream processing. This method enables the detection of new objects created from the object identified and tracked. The method also enables to identify when an object tracked has merged with another object. The merging of objects with other objects and the creation of objects from other objects is particularly important to identify persons leaving vehicles, luggage, or other objects in the environment monitored. The ability to detect if an object is created or disappears also enables the method of the present invention to identify if persons disturb objects or move objects. The method is implemented in the object tracking module 28 of FIG. 1. The method receives the following input: new video frame, background (reference frame), detected objects from the last iteration. The outputs of the method comprise the updated background, and the updated objects. FIG. 2 illustrates the four layers that jointly implement object tracking and detection method. The video frame pre-processing layer 52 uses a new frame and one or more reference frame for generating a difference frame representing the difference between the new frame and the reference frame or frames. The reference frame can be obtained from one of the capture devices described in association with FIG. 1 or provided by the user. The difference frame can be filtered or smoothened. The objects clustering layer 54 generates new/updated objects from the difference frame and the last known objects. The scene characterization layer 56 uses the objects from the objects clustering layer 54 in order to describe the scene. The background-refreshing layer 58 updates the background (reference frame or frames) for the next frame calculation and a refreshing process uses the outputs of all the previous layers to generate a new reference layer or layers. Note should be taken that in other preferred embodiments of the invention other similar or different processes could be used to accomplish the underlying objectives of the system and method proposed by the present invention.

The first preferred embodiment of the invention regards an unattended object detection system and method. The unattended object could be a suitcase, a carrier bag, a backpack, or any other object that was left unattended in a security-sensitive area, such as an airport terminal, a train station's waiting room, a public building, or the like.

Figure 3A:
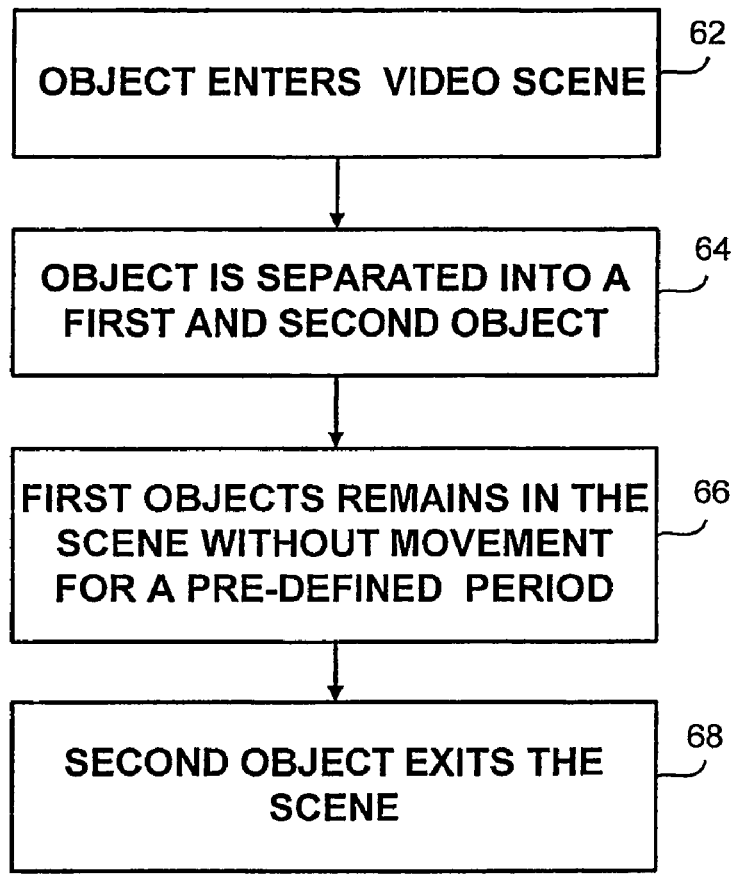
FIG. 3A is a simplified flowchart illustrative of the operation of unattended luggage detection application, in accordance with the first preferred embodiment of the present invention.

Referring now to FIG. 3A showing a flowchart illustrative of the operation of unattended luggage detection application of the method of the present invention. An unattended luggage event is detected via the performance of a sequence of operative steps. The logic underlying the performance is based on a specific scenario. In the scenario it is assumed that a terrorist or any other individual having criminal intent may enter a security-sensitive area carrying a suitcase. In one example, the suitcase may contain a concealed explosive device. In another example, the suitcase may have been lost or unattended for a prolonged length of time. In yet another application, a suitcase or an object may have been taken without authority. In the first example, the individual may surreptitiously (in a manner that non-recognizable by the monitoring cameras) activate a time-delay fuse mechanism connected to the explosive device that is operative in the timed detonation of the device. Subsequently, the individual may abandon the suitcase unattended and leave the security-sensitive area for his own safety in order not to be exposed to the damage effected by the expected detonation of the explosive device. The following operative conclusions, indicating certain sub-events, are reached by the suitable execution of sets of computer instructions embedded within a specifically developed computer program. The program is operative in the analysis of a sequence of video images received from a video camera covering a security-sensitive area, referred herein below to as the video scene. An unattended luggage event is identified by the program when the following sequence of sub-events takes place and detected by the execution of the program: a) an object enters the video scene (62). It is assumed that the object is a combined object comprising an individual and a suitcase where the individual carries the suitcase. b) The combined object is separated into a first separate object and a second separate object (64). It is assumed that the individual (second object) leaves the suitcase (first object) on the floor, a bench, or the like. c) The first object remains in the video scene without movement for a pre-defined period of time (66). It is assumed that the suitcase (first object) was left unattended. d) The second object exits the video scene (68). It is assumed that the individual (second object) left the video scene without the suitcase (first object) and is now about leave the wider area around the video scene. Following the identification of the previous sub-events, referred to collectively as the video scene characteristics, the event will be identified by the system as a situation in which an unattended suitcase was left in the security-sensitive area. Thus, the unattended suitcase will be considered as a suspicious object. Consequently, the proposed system may generate, display and/or distribute an alarm indication. Likewise, in an alternative embodiment in step 62, a first object, such as a suitcase or person monitored is already present and monitored within the video scene. Such object can be lost luggage located within the airport. Such object can be a person monitored. In step 64 the object merges into a second object. The second object can be a person picking up the luggage, another person to whom the first person joins or a vehicle to which the first person enters. In step 66 the first object (now merged with the second object) moves from its original position and at step 68 of the alternative embodiment exists the scene. The system of the present invention will provide an indication to a human operator. The indication may be oral, visual or written. The indication may be provided visually to a screen or delivered via communication networks to officers located at the scene or to off-premises or via dry contact to an external device such as a siren, a bell, a flashing or revolving light and the like.

Referring now to FIG. 3A which illustrates the control parameters of the unattended luggage detection application. In order to set up the unattended luggage detection application, the user is provided with the capability of defining the following control parameters: a) area or areas within the scanned zone wherein the system will search for suspected objects (70), b) the dimensional limits of the detected object (72). Objects having dimensions out of the limits defined will not be detected as suspected objects, and c) a time out value that is the amount of time that should pass from the point-in-time at which the suspected object was detected as non-moving and the point-in-time until an alarm is generated. Once an alarm is raised the officer reviewing the monitored scene may request the system to provide a playback so as to identify the objects in question. Once playback resumes the officer may tap on a touch sensitive screen (or select the image by other means such as a mouse, a keyboard, a light pen and the like) and the system may play back the history of video captured in association with the relevant object or objects. If a second object, such as a luggage left unattended is played back, the playback will identify the person taking or leaving the object. The officer may select such person and request play back or forward play to ascertain where the person came from or where the person went to and appropriately alert security officers. In order to debrief the event the officer may mine the database in various ways. One example would be to request the system to retrieve the events or objects that are similar to search parameters associated with the object or event he is investigating that can help in identifying the location of person or objects or the whereabouts or actions performed by the object. A suspect may place a suitcase given to him previously (not in the same scene) by a third person and leave the airport in a vehicle. Once the officer is alerted to the fact that the suitcase is unattended he may investigate the retrieve the third party associated with the handing of the suitcase and the vehicle associated with the suspect. The system, in real time, stores from each camera the various objects viewed. In the ordinary course of events the system would associate between like objects captured by various cameras using the initial search parameter (such as the suspect's parameters). During the investigation stage the system retrieves the associated objects and the event linked therewith and presents the events and object to the viewing officer in accordance with his instructions. The officer may decide to review forward or backward in time scenes the system would mark the associated objects thus allowing the officer to identify the stream of events elected for a particular object, such as existing a vehicle, handing over a suitcase, leaving a suitcase unattended, walking in unpredicted directions and the like.

As noted above the user may provide a predefined background. The background may be captured from the capturing devices. The human operator may define elements within the screen as background elements. Such can be moving shades or areas of little interest and the like.

Note should be taken that the above-described steps for the detection of a suspected object and the associated control parameters are exemplary only. Diverse other sequences of steps and different control parameters could be used in order to achieve the inherent objectives of the present invention.

Figure 3B:
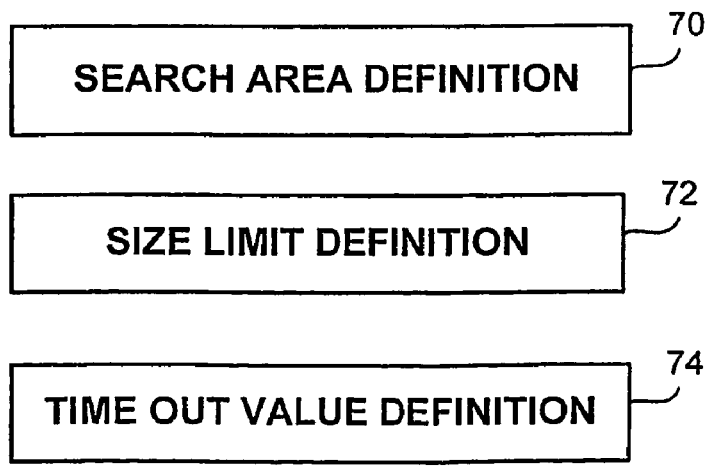
FIG. 3B illustrates the control parameters of the unattended luggage detection application, in accordance with the first preferred embodiment of the present invention.

The second preferred embodiment of the invention regards a detection of vehicles parked in restricted area or moving in restricted lanes. Airports, government buildings, hotels and other institutions typically forbid vehicles from parking in specific areas or driving in restricted lanes. In some areas parking is forbidden all the time while in other areas parking is allowed for a short period, such as several minutes. In the second preferred embodiment of the invention a system and method is proposed that detect vehicles parking in restricted areas for more than a pre-defined number of time units and generates an alarm when identifying an illegal parking event of a specific vehicle. In another preferred embodiment the system and method of the present invention can detect whether persons disembark or embark a vehicle in predefined restricted zones. The use of the embodiment described in association with FIGS. 3A, 3B can be employed in association with the application of the invention described below in association with FIGS. 4A, 4B.

Figure 4A:
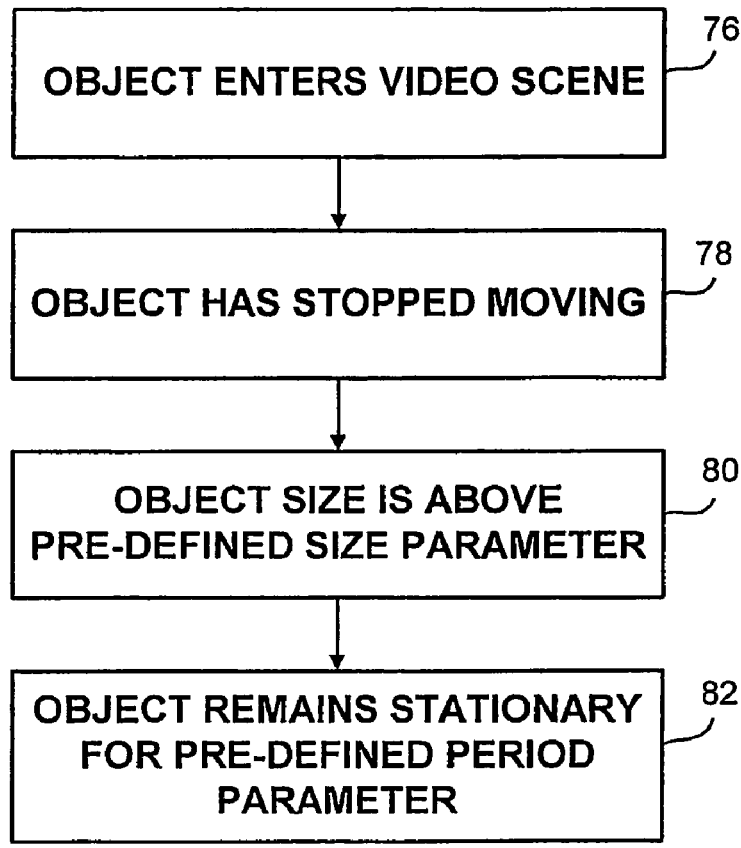
FIG. 4A is a simplified flowchart illustrative of the operation of the city center application, in accordance with the second preferred embodiment of the present invention.

Referring now to FIG. 4A which shows an exemplary flowchart illustrative of the operation of the city center application. An illegal parking event is detected via the performance of a sequence of operative steps. The logic underlying the performance is based on a specific exemplary scenario. In the scenario it is assumed that one or more persons may drive into a security-sensitive area in a specific vehicle. The vehicle could contain a powerful hidden explosive device that designed to be activated by one of the occupants of the vehicle or persons later embarking said vehicle in a restricted zone. Alternatively, the one or more occupants of the vehicle could be armed and may plan an armed attack against specific targets, such as individuals entering or exiting the building. In the first case scenario one of the occupants may surreptitiously (in a manner that is non-recognizable by the monitoring cameras) activate a time-delay fuse mechanism connected to the explosive device that is operative in the timed detonation of the device. Subsequently, the occupants may abandon the vehicle and leave the security-sensitive area for their own safety in order not to be exposed to the damage effected by the expected detonation of the explosive device. In a second case scenario, the occupants may remain in the vehicle while waiting for the potential target, such as an individual about to enter the scene either from the building or driving into the area. In another embodiment the vehicle may park in a restricted zone where such parking is not allowed in specific hours or where parking or standing is restricted for a short period of time. The following operative conclusions are achieved by the suitable execution of sets of computer instructions embedded within a specifically developed computer program. The program is operative in the analysis of a sequence of video images or other captured data received from the cameras covering a security-sensitive area (referred herein under to as the video scene). An illegal parking event is identified by the program. when the following sequence of sub-events takes place and detected by the execution of the program: a) an object enters the video scene (76). The system identifies the object and in accordance with size and shape is assumed to be a vehicle occupied by one or more individuals. b) The object has subsequently to entering the restricted zone stopped moving (78). It is assumed that the vehicle has stopped. c) The dimensions of the object are above a pre-defined dimension parameter value (80). The dimensions of the object are checked in order to distinguish between vehicles and pedestrians that may enter the same area and stop therein (for example, sitting down on a bench). The size of the object is also important to determine the direction of movement of the object. Thus, objects growing bigger are moving in the direction of the capturing device while objects whose size is reduced over time are assumed to be moving away from the capturing device. Certain predefined parameters as to size may be pre- programmed into the system in association with a specific background image. d) The object-stays without motion for a pre-defined period (82). As described in association with FIGS. 3A, 3B the system may detect whether an occupant of the object has left the object and is. now about to leave the wider area around the video scene. Following the identification of the previous sub-events, referred to as specific video scene characteristics, the event will be identified by the system as a situation in which an illegally parked vehicle was left in the security-sensitive area unattended. Thus, the parked vehicle will be considered as a suspicious object. Another event, which is recognized as suspicious, is where the vehicle is moving in an unpredicted direction or if an object, such as a person, is leaving the vehicle and moving to an unpredictable direction. An predicted direction can be predefined and an unpredicted direction is the direction opposite or a direction which does not match a predefined direction of flow of persons or vehicles. For example, in an airport the sidewalk where persons disembark from vehicles can be defined as a predicted direction and the side opposite the sidewalk and across the lanes of travel can be defined as the unpredicted direction. Thus, if persons disembarking vehicles at the airport leave the vehicle unattended (stationary for a predefined period of time) and walk or run not towards the airport, but rather to the opposite the system identifies a suspicious event. In city centers the same can be applied near bus depots or train stations and also in retail establishments monitoring areas not for public access.

Another parameter, which can be viewed, is the speed of the object. Speeding away from the vehicle can be an additional indicator that a suspicious event is taking place. The parked vehicle may also be regarded as suspicious if it is parked in the restricted zone more than a predefined period of time. Consequently, the proposed system may generate, display and/or distribute an alarm indication. Alternatively, if the occupants of the vehicle did not leave the vehicle but still wait in the vehicle an alert can be raised, assuming a person is waiting in the vehicle in suspicious circumstances or parking illegally. In this scenario too the parked vehicle will be considered a suspicious object. Consequently, the proposed system may generate, display and/or distribute an alarm indication. Once an alarm is raised the officer reviewing the monitored scene may request the system to provide a playback so as to identify the objects in question. Once playback resumes the officer may tap on a touch sensitive screen (or select the image by other means such as a mouse, a keyboard, a light pen and the like) and the system may play back the history of video captured in association with the relevant object or objects. If a second object, such as a person disembarked the vehicle the officer may tap the object and request a follow up playback associated just with that person. The playback or play forward feature allows the officer to make a real time determination as to the objects nature including information stored in the database (such as parameter association with the object) and determine the next action to be taken.

In another embodiment an alert may be raised as soon as an object in the size of a vehicle as determined by the relative size of the object as predefined in the system enters a restricted lane. The application concerning restricted lanes may check the size of the vehicles in such lanes as bus lanes wherein only buses (which are larger than vehicles) are allowed. If the object is a vehicle, i.e. smaller than a bus, an alert may be raised. The system may identify the vehicle and later a ticket may be issued to the owner of the vehicle. This application is extremely useful for policing restricted lanes without having a police unit on the scene.

In another embodiment of the invention, a database of recognized vehicle plate numbers can be utilized to assist in the off line investigation and associated identification of the owner of a suspicious vehicle. The database can also be used to determine whether the number of the license plate is stolen or belongs to a suspect on a pre-supplied list.

Figure 4B:
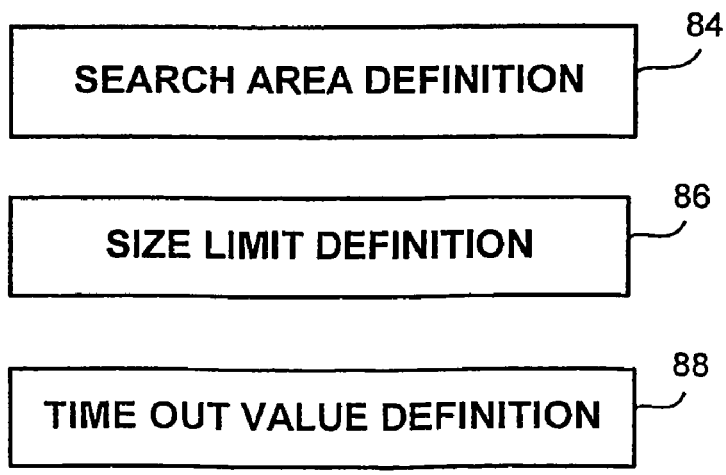
FIG. 4B illustrates the control parameters of the city center application, in accordance with the second preferred embodiment of the present invention.

Referring now to FIG. 4B the exemplary control parameters of the city center application are shown. In order to set up the illegal parking event detection application, the user is provided with the capability of defining the following parameters: a) area or areas within the scanned zone wherein the system will search for suspected objects (84), b) the dimensional limits of the detected object (86). The minimal dimensional values provided in order to limit the type of object as a vehicle, and c) a time out value (88) that is the amount of time that may pass between the point-in-time at which the object stopped moving and the point-in-time where an alarm will be generated.

Note should be taken that the above-described steps for the detection of an illegally parked vehicle and the associated control parameters are exemplary only. Diverse other sequences of steps and different parameters could be used in order to achieve the inherent objectives of the present invention.

Figure 5:
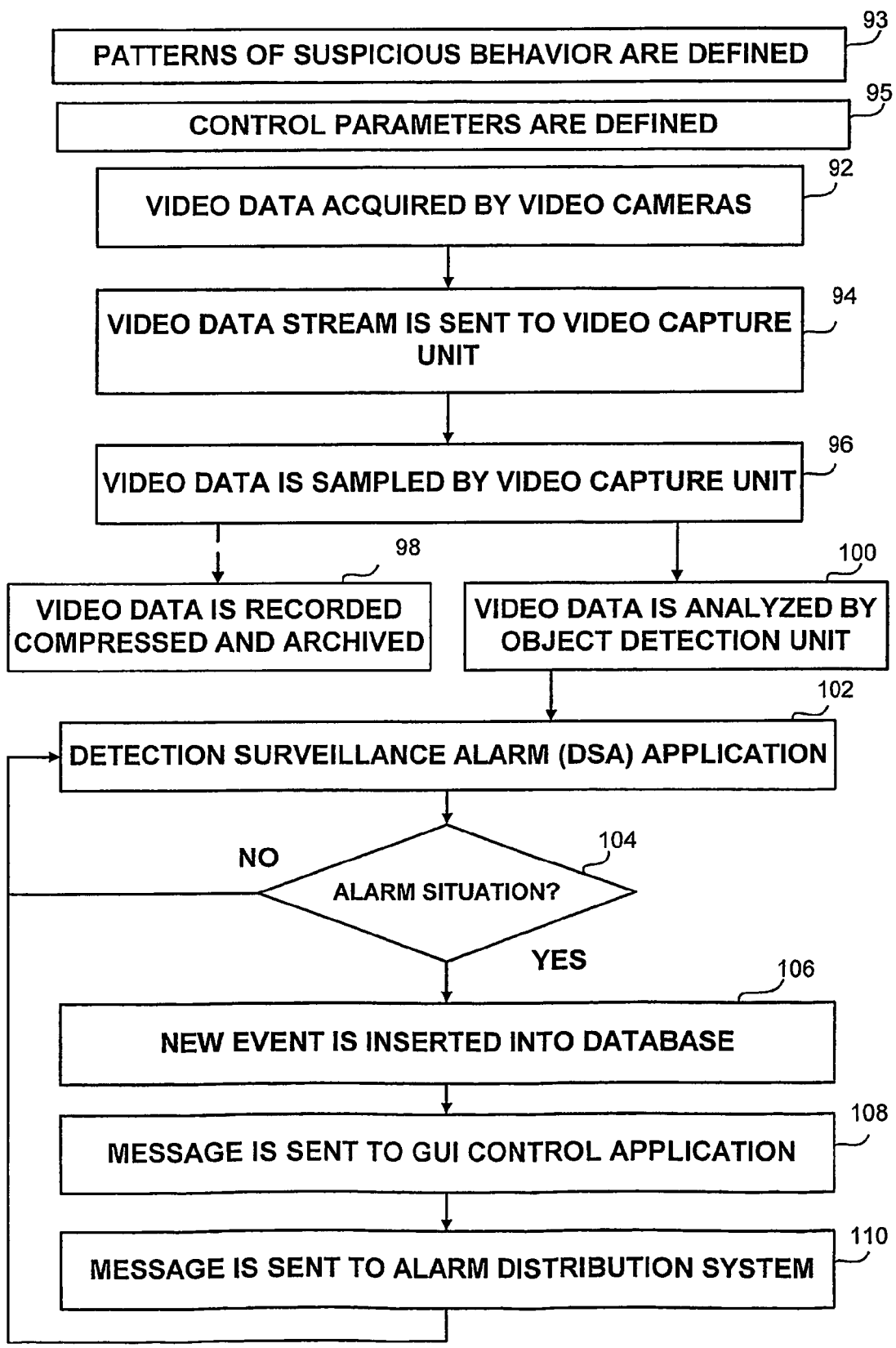
FIG. 5 is a flowchart describing the operation of the proposed method, in accordance with the preferred embodiments of the present invention.

Referring now to FIG. 5 which is a flowchart describing the operation of the proposed method. The fundamental logical flow of the method is substantially similar for both the first preferred embodiment concerning the unattended luggage detection and for the second preferred embodiment concerning the detection of an illegally parked vehicle. At step 93 a set of suspicious behavior patterns are defined. At step 95 a set of application and control parameters are defined. Both steps 93 and 95 are performed offline. The behavior patterns are implemented in the DSA application 46 of FIG. 1. while the control parameters are stored in the application and setup parameter file 46 of FIG. 1. At step 92 video data of a pre-defined video scene is acquired by one or more video cameras. At step 94 the video stream is transmitted to the video capture unit and at step 96 the video data is sampled. Optionally the video data is recorded, compressed and archived on auxiliary storage devices, such as disks and/or magnetic tapes (step 98). Simultaneously the video input is transferred to the video analysis component. The object detection unit analyzes the video data (step 100) and activates a specific DSA application 100. In the first preferred embodiment the DSA application 100 is the unattended luggage detection while in the second preferred embodiment the DSA application 100 is the detection of an illegally parked vehicle. Another DSA application 100 is a lost object prevention application. Other applications are evident from the description provided above in association with FIGS. 3A, 3B, 4A, and 4B. At step 104 it is determined whether, in accordance with the specific application and the associated parameters, including optional database parameters, an alarm state was detected by the video analysis unit. If no alarm state was identified then program control returns to the application 102. When an alarm state was raised at step 106 the alarm event is inserted into the event database, at step 108 a suitable message including alarm state details is sent to Graphic User interface (GUI) control application, at step 110 an optional message including alarm state-specific details is sent to the optional alarm distribution system to be distributed to a set of pre-defined monitor devices, such as wireless, personal data assistance devices, pagers, telephones, e-mail and the like.

The GUI control application 108 prompts the user for a suitable response concerning the alarm or optionally presents the user in real time with the video data sent by the camera the output of which generated the alarm. The alarm can be provided as text or pop up window on the screen of the operator, as e-mail sent to an officer, SMS message sent to a cellular phone, an automated telephone call to an officer, a text pager message, pictures or video stream sent the officer's portable device or hand held device, or send via a dry contact to generate a siren or an audio or visual indication and the like. The message could be provided to one or many persons or to specific persons associated with the specific event or alarm. The suspicious object on the video images is emphasized in a graphic manner, such as encircling the object in a circle-like or oval graphic element that is overlaid on the video image. Other information concerning the object, such as the object its size, speed, direction of movement, range from camera, if identified and the like, will appear next to the object's image or in another location on the screen. If the optional recording and archiving unit and the associated video archive files are implemented on the system then the user is provided with the option of video data re-play. When the optional alarm distribution component is implemented on the system, the alarm message will be appropriately distributed to a set of pre-defined and suitable pre-configured locations.

Objects monitored by surveillance systems may move in unpredicted directions. In For example, in an airport surveillance scene a person may arrive to the scene with a suitcase, enter the terminal building, leave the suitcase near the entrance of a terminal, and then leave the terminal. In another similar example, a first object (a vehicle) may arrive to the entrance of a terminal, a person (second object) may exit the vehicle, walk away in a direction opposite to the terminal, thus leaving the scene. In order to recognize patterns of unpredictable behavior a set of pre-defined rules could be implemented. These rules assist the system in capturing unpredictable behavior patterns taking place within the scenes monitored by the system.

The present system collects and saves additional information relating to each object. An initial analysis is performed in connection with each object. Apart from the circle-like shape and location of the object, the system attempts to identify whether the object is a person or an inanimate object. In addition, the object will collect and save object parameters such as the object-normalized size, distance from camera, color histogram. If the person is a person a face recognition algorithm is activated to try and determine whether the person is recognized. Recognized persons can be those persons that have been previously identified in other objects or may be faces that are provided to the system, such as from law enforcement agencies or that are previously scanned by the employer. Other parameters may also be associated with the object such as name, other capturing devices, speed and the like.

When sufficient computing power is available, the system would also perform in real time a suitable analysis of the object in order to create associated search parameters, such as, for example, color histogram and other search parameters mentioned above and to immediately alert officers if the analysis leads to predetermined alarm status, such as when the a particular face is recognized which is a wanted person or a person not allowed or recognized in a restricted zone. In addition, in on line mode the system can identify more than one parameters, such as a non-recognized face in a restricted zone and speaking in a foreign language, or a person not wearing a particular identifying mark (such as a hat or a shirt in a particular color) and the person is exiting a vehicle.

The proposed system and method provide real-time and off-line processing of suspicious events. For example, when a vehicle arrives at a terminal of an airport or train station and a person leaves the vehicle to a direction opposite the terminal, the present system and method will automatically alert the user. Such suspicious behavioral patterns are predetermined and the present system and method analyzes events to detect such events. The present system and method is further capable of identifying a set of linked events associated with the same object. An object can be defined as any detected object that continues to move within the captured scene. An event is defined as a series of frames capturing a scene and objects there within. The event can be associated with a particular capturing device. Linked events to the same object relate to a single object in the same area throughout the surveillance period whether captured by one or more cameras and appearing in one or more events. The system will track. (either upon request or automatically) an object through one or more events. The present system and method also provide the ability to associate a retrieved event or object with unique parameters of such an object, in addition to the object oval characteristics and location. Such would include, for example face recognition, color of clothes through the use of a histogram color. The difference between the color of the clothes and the color of the shirt of an object, color per zone in the object, such as the color of a hair, normalized size subject to the distance from the camera, and normalized shape of objects such as the size of a suitcase. The use of object associated parameters in addition to the object's shape and position enable the post event data base search of an object according to the parameters to quickly obtain the event or events associated with the object or other objects associated with the object. Such parameters also enable the user of the present invention to investigate and request the system to identify a particular object or event. This enables a better retrieval of the events and objects. The system may also, in real time, associate the parameters with objects and perform rule checking to determine if the objects comply with rules that are permitted in the scene, such as objects are not left unattended, objects move is specific directions, objects do not depart from other objects in specific locations, and the like.

The additional embodiments of the present system and method will now be readily apparent to person skilled in the art. Such can include crowd control, people counting, an offline and online investigation tools based on the events stored in the database, assisting in locating lost luggage (lost prevention) and restricting access of persons or vehicles to certain zones. The applications are both for city centers, airports, secure locations, hospitals and the like.

It will be appreciated by persons skilled in the art that the present invention is not limited to what has been particularly shown and described hereinabove. Rather the scope of the present invention is defined only by the claims, which follow.

What is claimed is:

1. A surveillance system for the detection of an alarm situation, the system comprising the elements of:
    a video analysis unit for analyzing at least two video data streams recorded by at least two capturing devices, each of the two streams representing images of a monitored area, the video analysis unit comprising an object tracking module for tracking the movements and the location of at least two video objects seen in the at least two video data streams;
    a detection, surveillance and alarm application for receiving video data analysis results from the video analysis unit, for automatically identifying a first event associated with a first video object in a first video data stream, identifying a second event associated with a second video object a in a second video data stream, and linking the first event and the second event through association of the first object and the second object, and for generating an alarm signal; and
    an event database for storing the first video object, the second video object, video object parameters, the first event and the second event,
    wherein tracking the movements and the location of each of the at least two video objects is done by generating difference frames representing the differences between at least two reference frames and another frame from one of the at least two video data streams.

2. The system of claim 1 further comprises the elements of:
    an application driver to control the detection, surveillance and alarm application;
    a database handler to access, to update and to read the event database;
    a user interface component to communicate with a user of the system;
    an application setup and control component to define the control parameters of the application; and
    an application setup parameters table to store the control parameters of the application.

3. The system as claimed in claim 1 further comprises the elements of:
    a video data recording and compression unit to record and compress video data representing images of a monitored area;
    a video archive file to hold the recorded and compressed video data representing images of the a monitored area; and
    an alarm distribution unit to distribute the alarm signal representing an alarm situation to at least one alarm and messaging device.

4. The system as claimed in claim 1 further comprises the elements of:
    at least two video cameras to obtain the images of a monitored area;
    at least one video capture component to capture video data representative of the images of the monitored area;
    at least one video transfer component to transfer the captured video data to the video analysis unit and the recording compressing and archiving unit; and
    at least one computing and storage device.

5. The system as claimed in claim 4 wherein any of the at least two video cameras; the at least one video capturing component; the at least one video transfer component and the at least one computing and storage device can be separated and can be located in different locations.

6. The system as claimed in claim 4 wherein the video capture component captures audio or thermal information or radio frequency information in synchronization with the video data.

7. The system as claimed in claim 4 wherein the interface between the at least two video cameras; the at least one video capturing component; the at least one video transfer component and the at least one computing and storage device is a local or wide area network or a packed-based or cellular or radio frequency or micro wave or satellite network.

8. The system as claimed in claim 1 wherein the object tracking module comprises the elements of:
    a video frame preprocessing layer for determining the difference between at least two video frames; an objects clustering layer for detecting at least one object in accordance with the determined difference;
    a scene characterization layer for characterizing the a least one object according to least one characteristic of a scene; and a background refreshing layer for preparing at least one updated reference according to the determined difference.

9. The system as claimed in claim 1 wherein the detection surveillance and alarm application is operative in the detection of at least one unattended object in the monitored area.

10. The system as claimed in claim 9 wherein the at least one unattended object is a luggage left in an airport terminal for a pre-determined period.

11. The system as claimed in claim 10 the at least one unattended object is a vehicle parking in a restricted zone for a pre-defined period.

12. The system as claimed in claim 1 wherein the detection surveillance and alarm application is operative in the detection of an unpredicted object movement.

13. The system as claimed in claim 1 wherein the analysis is also performed on audio data or thermal imaging data or radio frequency data associated with the video data or the first video object or the second video object in synchronization with the video data.

14. The system of claim 1 wherein the detection surveillance and alarm application is operative in the detection of a video object moving in a direction that does not match a predefined flow direction.

15. The system of claim 1, wherein the first event or the second event is identified using a size of the video object, and at least one parameter not related to the object.

16. The system of claim 15 wherein the at least one parameter is selected from the group consisting of: search area and time out.

17. The system of claim 1 wherein linking the first event and the second event is done in accordance with the first object's and the second object's oval characteristics and location.

18. The system of claim 1 wherein the at least two reference frames are captured at least two capture devices.

19. A surveillance method for the detection of an alarm situation, the surveillance to be performed on at least one monitored scene having at least two cameras, the method comprising the steps of:
obtaining video data streams from the at least two cameras representing images of the at least one monitored scene;
analyzing the obtained video data streams representing images of at least one object within the at least one monitored scene, the analyzing step comprising the steps of identifying a first video object associated with a first event in a first video data stream and identifying a second video object associated with a second event in a second video data stream;
linking the first event and the second event through association of the first object and the second object; and
inserting the first video object, the second video object, the first event and the second event into an event database, wherein tracking the movements and the location of each of the at least two video objects is done by generating difference frames representing the differences between at least two reference frames and another frame from one of the at least two video data streams.

20. The method of claim 19 further comprising the steps of: retrieving the first video object or the second video object associated with the first event or the second event; and
according to user instruction displaying the first event or the second event associated with the first video object or the second video object.

21. The method of claim 19 wherein linking the first event and the second event comprises the steps of: retrieving the first event and the second event; and linking according to parameters of the first video object and the second video object, the first event with the second event.

22. The method of claim 19 further comprising the steps of: debriefing the first object associated with the first event to identify the pattern of behavior or movement of the first object within the at least one scene within a predefined period of time.

23. The method of claim 19 further comprising the steps of: pre-defining patterns of suspicious behavior; and pre-defining control parameters.

24. The method of claim 19 further comprising the steps of: recognizing an alarm situation according to the pre-defined patterns of suspicious behavior; and generating an alarm signal associated with the recognized alarm situation.

25. The method of claim 19 further comprises the steps of:
implementing patterns of suspicious behavior;
introducing pre-defined control parameters;
recording, compressing and archiving the obtained video data; and
distributing the alarm signal representing an alarm situation to at least one alarm and messaging device, across a pre-defined range of user devices.

26. The method as claimed in claim 19 wherein a predefined pattern of suspicious behavior comprises: an object entering a monitored scene; the object separating into a first distinct object and a second distinct object in the monitored scene; the first distinct object remaining in the monitored scene without movement for a pre-defined period; and the second distinct object leaving the monitored scene.

27. The method of claimed in claim 26 wherein the predefined pattern of suspicious behavior comprises: an object entering the monitored scene; the object ceasing its movement; the size of the object is recognized as being above a pre-defined parameter value; and the object remaining immobile for a period recognized as being above a pre-defined parameter value.

28. The method of claim 27 further comprising identifying information associated with the object for the purpose of identifying the at least one object.

29. The method of claim 27 further comprising receiving data from the video analysis unit and detecting within the video data a vehicle remaining in a restricted zone for at least a predefined period of time.

30. The method of claim 29 wherein detecting the vehicle remaining in the restricted zone is performed using a size of the object, and at least one parameter and at least one parameter not related to the object.

31. The method of claim 30 wherein the at least one parameter is selected from the group consisting of: search area and time out.

32. The method of claim 26 further comprising receiving data from the video analysis unit and detecting within the video data an unattended object within an area, wherein said unattended object has been unattended in the area for at least a predefined period of time.

33. The method of claim 32 wherein detecting the unattended object is performed using a size of the object, and at least one parameter not related to the object.

34. The method of claim 33 wherein the at least one parameter is selected from the group consisting of: search are and time out.

35. The method of claim 19 wherein the analysis comprises receiving data from the video analysis unit and detecting within the video data an object within an area, wherein said object moves in a direction that does not match a predefined flow direction.

36. The method of claim 19, wherein the first event or the second event is identified using a size of the video object, and at least one parameter not related to the object.

37. The method of claim 36, wherein the at least one parameter is selected from the group consisting of: search area and time out.

38. The method of claim 19 wherein linking the first event and the second event is done in accordance with the first object's and the second object's oval characteristics and location.

39. The method of claim 19 wherein the at least two reference frames are captured at least two capture devices.

* * * * *